Oct. 23, 1962 F. W. LIPPS, JR., ET AL 3,060,385

CARBON MONOXIDE FREQUENCY STANDARD

Filed Nov. 9, 1959 3 Sheets-Sheet 1

INVENTORS
FREDERICK W. LIPPS, JR.
JOSEPH H. HOLLOWAY
BY Kenway, Jenney, Witter & Hildreth
ATTORNEYS INVENTORS
FREDERICK W. LIPPS, JR.
JOSEPH H. HOLLOWAY
BY Kenway, Jenney, Witter & Hildreth
ATTORNEYS

CARBON MONOXIDE FREQUENCY STANDARD

Filed Nov. 9, 1959 3 Sheets-Sheet 3

INVENTORS
FREDERICK W. LIPPS, JR.
JOSEPH H. HOLLOWAY
BY Kenway, Jenney, Witter & Hildreth
ATTORNEYS 3,060,385
Patented Oct. 23, 1962

3,060,385

CARBON MONOXIDE FREQUENCY STANDARD

Frederick W. Lipps, Jr., Melrose, and Joseph H. Holloway, Topsfield, Mass., assignors to National Company, Inc., Malden, Mass., a corporation of Massachusetts Filed Nov. 9, 1959, Ser. No. 851,605
22 Claims. (Cl. 331—3)

Figure 1:
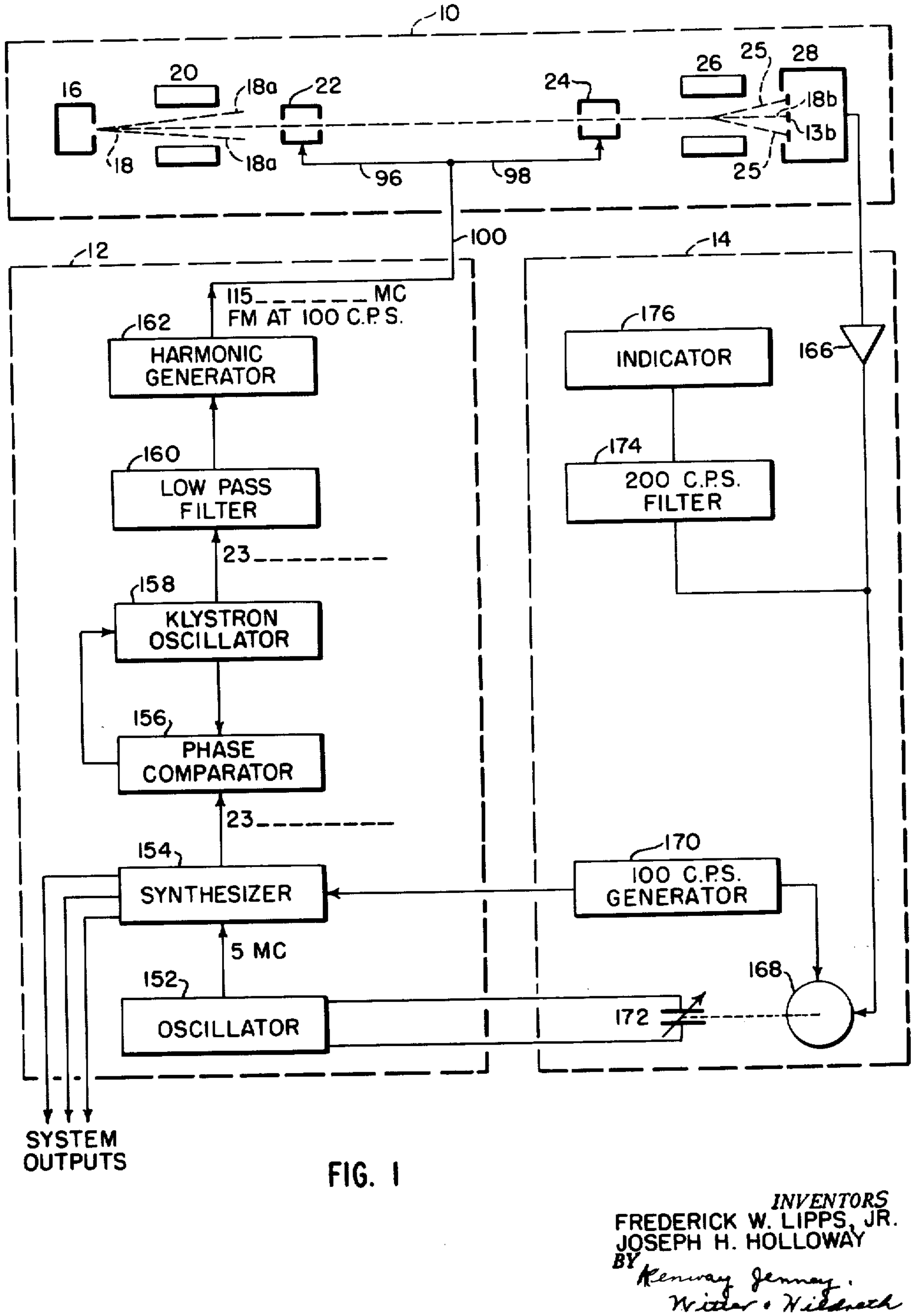

This invention relates to an improved molecular beam frequency standard utilizing a molecular resonance of carbon monoxide to control the frequency of an oscillator. More specifically, it relates to a practical frequency standard operating at a molecular resonance frequency substantially higher than the frequencies of prior molecular resonance devices and therefore capable of a precision and stability at least an order of magnitude greater than heretofore possible.

A molecular beam frequency standard utilizes as a reference the substantially invariant frequency corresponding to the transition of a molecule or atom from one energy state to another. A molecule has a number of discrete energy states and in certain cases it may undergo a transition from one energy state to another by being subjected to electromagnetic radiation having a frequency $$\nu=\frac{W_2-W_1}{h}$$

where: $(W_2-W_1)$ is the difference in energy between the two states, and $h$ is Planck's constant. More specifically, by absorbing energy from the radiation, the molecule advances from the lower state characterized by an energy $W_1$ to the upper state characterized by an energy $W_2$. A molecule or atom in the upper state may, upon stimulation by radiation at the resonant frequency $\nu$, drop to the lower state, emitting a quantum of radiation at this frequency in the process.

The copending application of J. R. Zacharias et al., Serial No. 693,104, filed October 29, 1957, Patent No. 2,972,115 and assigned to the assignee of the present application, discloses a molecularly controlled frequency standard using the so-called Ramsey method in which a beam of molecules is passed through a state selector or separator which screens out the molecules in the lower of the two states $W_1$. The beam then enters a resonant cavity in which it encounters radiation from a signal generator whose frequency nominally equal the molecular or atomic resonance frequency. Upon leaving the resonant cavity, the beam passes through an intermediate region where the molecules are essentially undisturbed by outside effects and then enters another resonant cavity to which energy from the generator is also fed. A number of molecules, depending on the correspondence of the generator frequency to the natural molecular transition frequency, are raised to the higher energy state. The closer the frequency of the radiation corresponds to the resonant frequency, the greater is this number. The beam then passes through another separator which discards the molecules in one of the two energy states and directs those in the other to a detector. The detector provides an electrical signal proportional to the number of molecules impinging thereon, and this signal is fed back to the signal generator to control the frequency thereof in such manner as to maximize the number of molecules undergoing the energy state transition. This maintains the oscillator frequency at the value determined by the differences in energy between the two states utilized.

In another frequency standard disclosed in the application of J. H. Holloway, Serial No. 816,938, filed May 29, 1959, Patent No. 2,994,836, for "Molecular Beam Apparatus," and also assigned to the assignee of this invention, the beam is subjected to radiation at the transition frequency in a single cavity during two spaced time intervals, with the molecules being free of the radiation between these intervals. The operation of the apparatus is substantially similar to that of the standard described in the above Zacharias et al. application.

The words "molecule" and "molecular" are used in their generic sense herein, as referring to the smallest particle in a gas capable of independent movement. Since such particles, particularly in the case of metals, may consist of single atoms, these words are used interchangeably with "atom" and "atomic."

The resolution of a molecularly controlled frequency standard depends on such relatively invariant properties as the magnetic fields of electrons and nuclei, the charges of various subatomic particles, and the relative positions of the constituent parts of molecules in different energy states. Stabilities on the order of one part in $10^{11}$ have been obtained with the frequency standard disclosed in the above Zacharias et al. application, and further improvements may be had by recourse to the above-identified Holloway application and also the application of A. O. McCoubrey for "Molecular Beam Frequency Standard Incorporating Control of Static Field," Serial No. 842,018, filed September 24, 1959, and also assigned to the assignee of this application. There is a practical limit, however, to the resolution which may be obtained with any particular molecular resonance. The sharpness of Q of the resonance depends on its frequency. The higher the resonant frequency, the higher will be the effective Q of the resonance and the greater the resolution of the frequency standard.

However, the effective Q is not the only significant characteristic of a molecular resonance. The proportion of molecules in the molecular beam capable of making the desired transition is also of great importance. Most molecules have upwards of 10,000 or more energy states, and therefore the number in any one state is generally a very small fraction of the total. This means that the number capable of undergoing the desired transition in the resonance unit of the frequency standard is very small, resulting in a low signal-to-noise ratio. More specifically, the molecules reaching the detector after exposure to the transition-inducing radiation may constitute upwards of one half the total beam. If the number of molecules capable of undergoing the transition is a small percentage of the total, variations in this number resulting from small changes in the frequency of the controlled oscillator will comprise a minute part of the output signal of the detector and will be relatively inseparable from the background noise caused by the other detected particles. As a matter of fact, a figure of merit F for molecular resonances may be expressed by $F=Q\sqrt{n}$, where: Q is the effective Q of the resonance, and $n$ is the number of molecules per second making the desired transition at the resonant frequency.

A principal object of our invention is to provide an improved molecular beam frequency standard having a greater stability than heretofore attainable. Another object of the invention is to provide a molecular beam resonance unit adapted for incorporation in a frequency standard of the above character. Another object of the invention is to provide a resonance unit of the above character which operates at a substantially higher frequency than previous units and yet has a comparable signal-to-noise ratio. A further object of the invention is to provide a resonance unit of the above character adapted for low temperature operation, so that the velocity of the molecular beam may be substantially less than in prior units of this type. Another object of the invention is to provide a resonance unit of the above character which occupies a relatively small volume. A still further object of our invention is to provide a molecular beam adapted for operation in a resonance unit of the above character. Other objects will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Figures 2A, 2B, 3, 4:
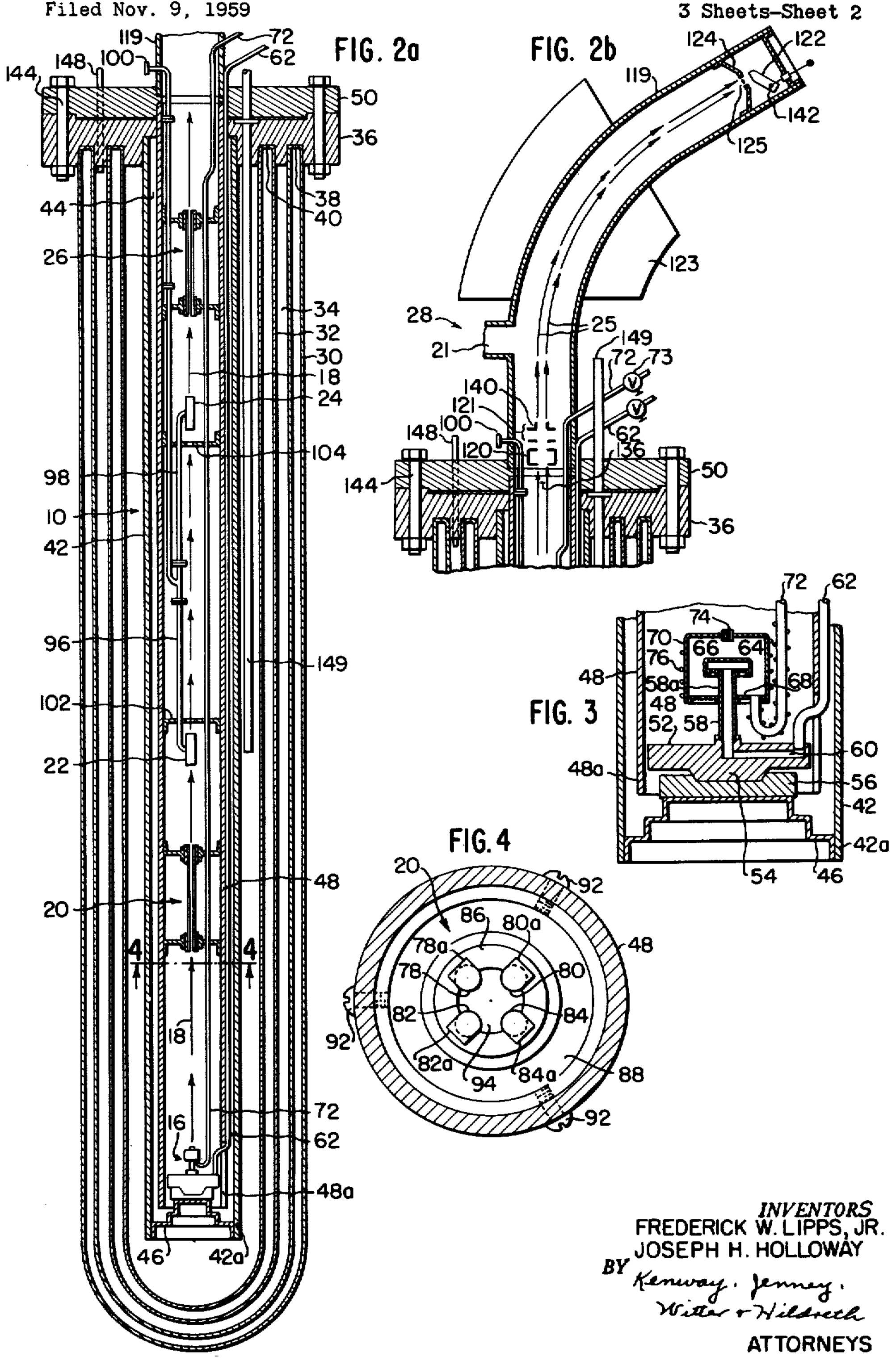
Figure 5:
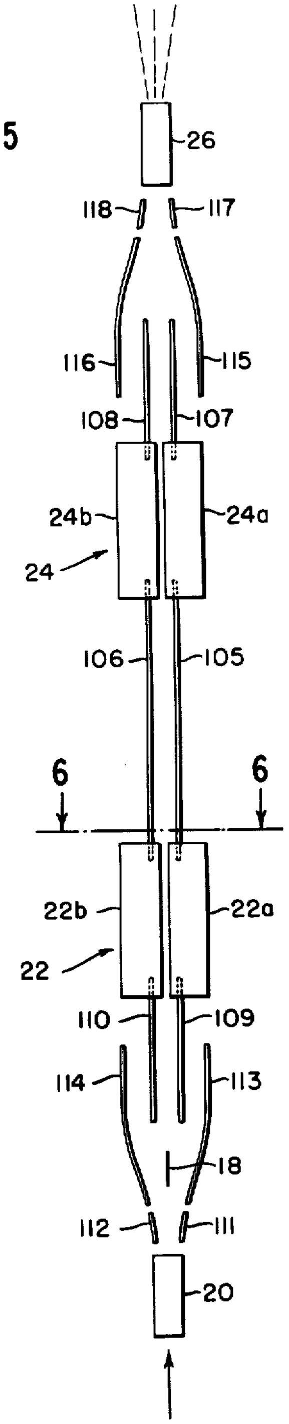
Figure 6:
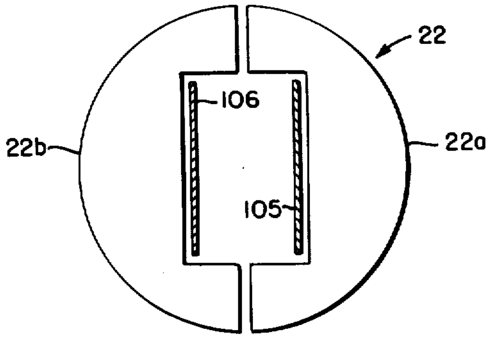

For a fuller understanding of the nature and objects of the invention, reference should be had to the following detailed description taken in connection with the accompanying drawings, in which:

FIGURE 1 is a schematic representation of a frequency standard incorporating the principles of our invention, FIGURE 2*a* is a view, partly in section, of a portion of a molecular beam resonance unit which may be used in the frequency standard of FIGURE 1, FIGURE 2*b* is a view, partly in section, of the remaining portion of the resonance unit of FIGURE 2*a*, FIGURE 3 is an enlarged sectional view of the molecular beam source incorporated in the resonance unit of FIGURE 2, FIGURE 4 is a sectional view looking along the axis of an electrostatic separator used in the resonance unit of FIGURE 2, FIGURE 5 illustrates static field structure which may be incorporated in the resonance unit, and FIGURE 6 is a view taken along line 6—6 of FIGURE 6.

Our frequency standard uses a rotational molecular resonance of carbon monoxide ($C^{12}O^{16}$) at 115 kilomegacycles, more than ten times as high as the frequency of the most accurate standards previously used. In its preferred embodiment the standard is provided with a beam source which projects a beam of carbon monoxide molecules through a double cavity resonance unit of the same general type as the one disclosed in the above copending application Serial No. 693,104. More specifically, the energy states utilized are (J,M) (O,O) and (1,O), corresponding to levels of rotational energy of the CO molecule. The frequency of the transition between these states is 115 kilomegacycles. At an operating temperature of 35° K., 8 percent of the molecules are in these energy states, and this number combines with the high frequency of the resonance to provide a greatly improved figure of merit.

The (O,O)←→(1,O) resonance is electrically excited, that is, the molecules absorb energy from the electric field of the radiation to which they are subjected. The resonant cavity power requirement is well within the capability of present day equipment. The size and weight of the apparatus is considerably less than that of previous frequency standards of this type, since the radiation is in the millimeter wavelength range, and the state selectors or beam separators use electrostatic fields rather than magnetic fields.

A further advantage of the carbon monoxide beam is the low temperature of operation. The resolution of a twin cavity frequency standard is a function of the travel time of the beam between its exposures to the transition-stimulating energy. Lengthening of this time improves the resolution. The low temperature of the carbon monoxide beam corresponds to a considerably lower average velocity of the beam molecules than is practicable for other substances, and the travel time of the beam is proportionately longer, resulting in improved resolution.

As seen in FIGURE 1, a frequency standard incorporating the principles of our invention includes a molecular beam resonance unit generally indicated at 10, a generator 12 whose output causes the energy level transitions in a molecular beam in the resonance unit 10, and a generator control circuit 14 which controls the frequency of the generator 12 in accordance with the output of the resonance unit. In the resonance unit 10 a molecular beam source 16 projects a cylindrical beam 18 of carbon monoxide molecules through an electrostatic state selector or separator 20. The molecules in the JO, MO energy state are focused by the separator 20 and proceed along the axis of the beam 18. Those in the J1, MO state are deflected away from the beam axis, as indicated at **18*a*, and are discarded. The discarded molecules may be absorbed by suitable carbon monoxide getter material (not shown), and also they may in part adhere to the wall of the resonance unit, which is maintained at a temperature below the freezing point of carbon monoxide, or diffuse toward an outlet 21** (FIGURE 2*b*) connected to a vacuum pump (not shown).

Again with reference to FIGURE 1, from the separator 20 the beam 18 proceeds through resonant cavities 22 and 24 which are turned to the frequency $\nu$ of the (O,O)→(1,O) transition of the carbon monoxide molecules. The cavities are excited in phase by the generator 12, and the beam 18 then passes through a second separator 26 similar to the separator 20. The molecules in the O,O state continue along the beam axis and are discarded. Those which have been elevated to the 1,O state by the radiation in the cavities 22 and 24 are deflected from the beam axis to form a conical beam indicated at 25. The beam 25 is detected in a detector 28 which provides an output voltage proportional to the number of particles per second detected by it. The electrical output of the detector 28 is used by the control circuit 14 in modifying the frequency of the generator 12 to maximize the detector output. Maximum output occurs when the output frequency of the generator 12 corresponds exactly to the frequency $\nu$ of the (O,O)→(1,O) transition of the carbon monoxide molecules in the beam 18. In this manner, the frequency of the generator 12 is made to coincide with the highly stable molecular resonance frequency.

Preferably, the resonance unit 10 operates in the vicinity of the freezing point of carbon monoxide. For example, the embodiment described herein is maintained at a beam temperature of approximately 35° K. A liquid helium environment is a practical means of obtaining temperatures in this range, and in FIGURE 2 we have illustrated a unit incorporating this feature. As shown therein, the resonance unit 10 is enclosed by a double Dewar arrangement of a type conventionally used to contain liquid helium. An outer double-walled glass tube 30 surrounds a similar tube 32. The inner surfaces of the double walls are silvered to minimize transfer of heat into the tubes by radiation. The space 34 between the tubes 30 and 32 is filled with liquid nitrogen, for example, and the resonance unit 10 is immersed in liquid helium within the tube 32.

The tubes 30 and 32 are maintained in their relative positions by a flange 36. The flange is provided with grooves 38 and 40 in which the tubes are resiliently force-fitted by means of suitable gasket material such as neoprene or the like (not shown).

The resonance unit 10 shown in FIGURES 2*a* and 2*b* includes a tubular housing 42 brazed in a counterbore 44 in the flange 36. The lower end **42*a* of the housing 42 is closed by an inverted cup-like pedestal 46 supporting the molecular beam source 16. An open ended cylindrical tube 48 which supports the separators 20 and 26 and cavities 22 and 24 is disposed within the housing 42. The tube 48 extends through the flange 36 and is secured by brazing to an upper flange 50. The lower end 48*a* of the tube 48 extends below and around the beam source 16**.

The beam source 16 is shown in detail in FIGURE 3. It has a base 52 within the tube 48 provided with a depending boss 54. The boss 54 fits into a mating depression in a block 56 secured to the pedestal 46 and thereby positions the beam source as well as the tube 48. A pipe 58 brazed to the base 52 communicates by way of a passage 60 with a conduit 62 secured to and extending along the tube 48 and upwardly through the flanges 46 and 50 (FIGURE 2*a*). A flange 64 is secured to the upper end 58*a* of the pipe 58, and an inverted cup 66 is brazed to the flange, thereby providing a vacuum-tight seal around the interior of the pipe 58 and cup 66. A second flange 68, supported on the pipe 58 below the flange 64, carries a second inverted cup 70. A pipe 72 extending upwardly through the tube 48 (FIGURES 2 and 3) provides communication from the exterior of the resonance unit 10 to the interior of the cup 70. A vacuum-tight valve 73 (FIGURE 2*b*) seals the upper end of the pipe 72. A collimator 74 in the cup 70 is disposed above the cup 66 on the beam axis of the resonance unit. The cup 70 and the lower portions of the pipe 72 are provided with a heating coil 76 whose function is set forth below.

In order to charge the beam source 16, the housing 42 is first evacuated by way of the outlet 21 (FIGURE 2*b*) and then liquid helium is admitted to the cup 66 through conduit 62. Next, gaseous carbon monoxide is fed to the pipe 72. The gas passes into the cup 70 where it condenses and solidifies on the chilled cup 66. The coil 76 may be energized at this time to prevent condensation of the carbon monoxide on the interior surfaces of the cup 70 and pipe 72. After a sufficient carbon monoxide charge has built up on the cup 66, the valve 73 is closed and the liquid helium is removed from the cup 66, pipe 58 and conduit 62. The temperature of the cup 66 and the carbon monoxide deposited thereon then rises to a point above the temperature of the liquid helium surrounding the lower portions of the housing 42 below the temperature of liquid nitrogen in the space 34 contacting the flange 36. The difference between these temperatures provides a temperature gradient in the tube 48 (FIGURE 2), and the temperature within the beam source 16 thus depends on the conductivity of this tube. The conductivity is a function of the material of the tube and its thickness. Preferably, the tube 48 is of stainless steel, and its thickness is adjusted to maintain the temperature at the cup 66 somewhat less than 35° K.

During operation of the beam source 16, energy is supplied to the heating coil 76 to raise the temperature at the surface of the carbon monoxide charge to 35° K. and thereby evaporate the carbon monoxide at a rate commensurate with the desired intensity of the molecular beam. Gaseous CO molecules within the cup 70 having the right velocity direction will pass through the collimator 74 which forms the particles into a well-defined beam projected through the separator 20 and succeeding elements of the resonance unit 10.

The density of the molecular beam 18 determines the strength of the output signal of the detector 28. The density may be increased by elevating the temperature of the source 16 and thereby raising the CO pressure within the source. However, the intermolecular spacing decreases as the beam density increases, resulting in an increased number of collisions and other undesirable interactions between the molecules. The collisions cause diffusion or defocusing of the beam 18 which should be narrow and well-defined for best results. A beam temperature of 35° K., corresponding to a density ef $2\times10^{13}$ per cubic cm. and a pressure of $10^{-4}$ mm. will provide good results, and satisfactory performance may be expected up to a temperature of roughly 55° K. for carbon monoxide.

The collimator 74 may be of the type described in the above copending application Serial No. 693,104, comprising alternate flat and corrugated strips of nickel foil. Preferably, however, the collimator is shaped to form a cylindrical beam. It may be formed from a flat and a corrugated strip of nickel foil by rolling the two strips together to form a spiral, with the corrugations parallel to the axis of the spiral. The length of the collimator, i.e., the dimension along the axis of the spiral, should be about 100 times the effective diameters of the tubular passages formed by the corrugations.

The separators 20 and 26 are similar in construction, and therefore a description of one of them will suffice. As seen in FIGURES 2*a* and 4, the separator 20 includes four axially extending electrodes in the form of wires 78, 80, 82 and 84. At each end of the separator the wires 78—84 are bent over at their ends 78*a*—84*a* and anchored in an insulator 86 of suitable ceramic or plastic material. Each insulator 86 in turn is mounted in a flange 88 secured in place in the tube 48 by screws 92.

The separation of the molecular beam passing through the aperture 94 of the separator 20 is achieved by means of an inhomogeneous electrostatic field maintained in the region encompassed by the wires 78—84. For example, the wires 80 and 82 may be positively charged and the wires 78 and 84 negatively charged, in which case there will be a strong field running directly between adjacent wires, with the field diminishing to zero strength at the center of the aperture 94 of the separator through which the beam 18 passes. The carbon monoxide molecules in the JO,MO energy state will be subjected to forces directed toward the center of the aperture 94 where the field is weakest, and those in the 1,O state will be forced outwardly toward regions having stronger fields. The mechanism by which this form of separation takes place depends on certain quantum-mechanical considerations which need not be explained in detail.

Illustratively, the wires 78—84 may have a 2 millimeter diameter with a 1 millimeter spacing between adjacent wires. The aperture 94 will then have an effective diameter of approximately 2 millimeters. Preferably, the wires are nickel plated in order to obtain smooth inert surfaces thereon. With the above spacing, a potential of approximately 10 kilovolts may be applied between adjacent wires in order to obtain the requisite field strength in the aperture 94. The wires may be charged by means of a pair of conductors (not shown) extending along the pipe 72 and connected to a suitable high voltage source.

As shown in FIGURE 2*a*, the cavities 22 and 24 are preferably cylindrical with their axes on the axis of the molecular beam 18. They are fed from wave guides 96 and 98 connected to an input wave guide 100. The wave guide 100 is connected to the output of the generator 12 (FIGURE 1). The wave guides, which also serve as supports for the cavities 22 and 24, are positioned by flanges 102 and 104 fitting within the tube 48. The cavities 22 and 24 and flanges 102 and 104 are suitably apertured to permit transit of the beam 18 through them.

The cavities 22 and 24 should be excited in phase as nearly as possible, and the relative lengths of wave guides 96 and 98 may be set to obtain this condition. The phasing may be determined from the symmetry of the (O,O)→(1,O) carbon monoxide resonance curve. Only when the radiation in the cavities is exactly in phase will the curve be symmetrical. To facilitate phase adjustment, the wave guides 96 and 98 may be brought out individually to the exterior of the resonance unit 10 for connection to the guide 100.

The diameter of the cavities determines their Q and also the homogeneity of the RF field over the cross section of the beam 18. A large diameter, corresponding to a higher mode of excitation, provides a higher Q. However, the homogeneity of the amplitude and direction of the oscillating electric field suffers. The problem is aggravated somewhat by the fact that at the frequency of the cavity excitation, 115 kilomegacycles, the diameter of the molecular beam 18 is a substantial portion of a wavelength. Accordingly, we prefer to operate the cavities in the $TM_{010}$ mode, although other modes of operation may be used. Thus, the cavities 22 and 24 may have an inside diameter of 0.19 cm. with a length of approximately 3 cm.

The resonance unit 10 of FIGURES 2*a* and 2*b* is not provided with means for subjecting the beam 18 to a static field from the time the beam enters the cavity 22 until it leaves the cavity 24. However, a static field structure may be incorporated in the resonance unit. The static field generated aligns the rotational axes of the molecules and thereby increases the number of molecules having the proper orientation to receive energy from the RF field within the cavities 22 and 24. The electric field of the RF energy should be aligned with the static field for optimum results.

In FIGURES 5 and 6 we have illustrated one form which the static field structure may take. The cavities 22 and 24 are formed from portions 22*a* and 22*b* and 24*a* and 24*b*. The two portions of each cavity are insulated from each other and the mode of cavity excitation chosen must be consistent with this configuration. A static field may be set up within each cavity by applying an electric potential between the "*a*" and "*b*" portions thereof. The field is maintained between and beyond the cavities 22 and 24 by parallel plates 105—106, 107—108, and 109—110 extending into the cavities as depicted in FIGURE 5. The plates 105—110 are maintained at substantially the same potentials which would exist at their positions within the cavities 22 and 24 if the potentials within the cavities were due solely to the voltage applied to the "*a*" and "*b*" portions. The plates extend far enough into the cavities to minimize aberrations in the static field due to "end effects." Therefore, the static field strength from the entrance to the plates 109—110 to the exit from plate 107—108 is essentially constant. The field strength may be on the order of 1 volt per cm.

It is also desirable to prevent a large abrupt change from the high field strength within the separator 20 to the low field strength within the cavities 22 and 24 and between the plates 105—110. An abrupt change from the plates 107—108 to the separator 26 should also be avoided. Large abrupt changes in static field may cause energy level transitions in the molecular beam, and such transitions are desirable only in the cavities 22 and 24. Therefore, we have provided lead-out electrodes in the form of plates 111—112 and 113—114 which gradually change the field strength from the level in the separator 20 to the level between the plates 109—110. The voltage applied to the plates 113—114 is less than that on the plates 111—112, and the spacing between the lead-out electrodes increases, so that the field is progressively diminished to the low level as the beam 18 travels to the plates 109—110. Similarly arranged lead-in electrodes adjacent to the separator 26 include plates 115—116 and 117—118.

The various voltages required for the structure of FIGURES 5 and 6 may be supplied by any well-regulated source of conventional design.

As seen in FIGURE 2*b*, the detector 28 includes an arcuate vacuum envelope 119 brazed into the flange 50 and communicating with the interior of the tube 48. The envelope 119 encloses an ionizer 120, drawing-out and focusing electrodes indicated at 121, and a collector-amplifier generally indicated at 122. The molecules in the J1,MO energy state appearing in the beam 25 (FIGURE 1) are ionized by the ionizer 120 and then focused and accelerated by the electrodes 121. Next, the beam 25 passes through the field of a mass spectrometer magnet 123 and is deflected toward the collector-amplifier 122. A baffle 124 disposed in front of the collector-amplifier is provided with an aperture 125 in the path of the carbon monoxide molecules in the beam 25. Passage through the aperture 125 is generally restricted in a well-known manner to carbon monoxide and other substances such as nitrogen ($N_2^{14}$) having the same ratio of charge to mass. Other substances will strike the baffle 124 and diffuse toward the outlet 21.

Still referring to FIGURE 2*b*, the ionizer 120 accomplishes its function by electron bombardment of the molecules passing through it. Ionizers of this type are well known, and a detailed description of the ionizer 120 is therefore unnecessary. The conical beam 25 passes through an aperture 132 in the ionizer, and collisions between electrons and the molecules in the beam ionize the latter. The core portion 18*b* (FIGURE 1) of the beam 18, containing the carbon monoxide molecules in the JO,MO state focused by the separator 26, strikes a baffle 136 and then diffuses toward the outlet 21.

The electrodes 121 include an accelerating grid 138 and a focusing structure 140 of conventional design. The structure 140 eliminates the divergent conical shape of the beam 25, converting it to an annular cylindrical shape.

The collector-amplifier 122 of FIGURE 2*b* may take the form of an electron multiplier whcih develops a signal at its anode 142 proportional to the number of ions passing through the aperture 125. The output signal of the amplifier 122 thus varies according to the number of molecules in the beam 25, and this depends on the number of carbon monoxide molecules undergoing the (O,O)→(1,O) transition in the cavities 22 and 24.

To assemble the resonance unit 10, the housing 42 is first secured to the flange 36, and the tube 48 is secured to the flange 50. The envelope 119 may also be brazed in place at this time. Next, the tube 48, with its associated parts assembled in it, is inserted through the flange 36 into the housing 42, and the flanges 36 and 50 are fastened together with bolts 144. The unit thus formed may then be lowered into place onto the tubes 30 and 32, which may be mounted in any convenient manner on a suitable base (not shown).

In order to prevent diffusion of the beam 18 by collision with extraneous molecules and also to minimize the number of such molecules reaching the collector-amplifier 122 and contributing to noise in the output thereof, a high vacuum of at least $10^{-7}$ mm. Hg should be maintained within the housing 42 and envelope 106. Accordingly, these parts should, where practicable, be brazed to the parts connected to them. A deformable copper gasket 146 is provided between the flanges 36 and 50 to prevent leakage into the resonance unit from between the flanges. The wave guide 100 is provided with a vacuum-tight microwave window. Maintenance of vacuum conditions within the resonance unit is aided by the low temperature of operation, since many gaseous molecules striking various parts within the resonance unit will adhere thereto. Tube 148 and 149, extending through the flanges 36 and 50, provide access to the space 34 and the interior of the tube 32, respectively, to admit liquid nitrogen and liquid helium.

The frequency of the molecular resonance taking place in the resonance unit 10 depends to a small degree on the magnetic and electric fields passing through the beam 18 in and between the cavities 22 and 24. Since fields originating externally of the resonance unit may vary with location and time, it is best to eliminate them altogether. Accordingly, the resonance unit 10 should be enclosed by a suitable low reluctance magnetic shield (not shown) which, because it is metallic, will also serve as an electric shield.

The make-up of the generator 12 is shown in FIGURE 1. A five megacycle oscillator 152 is coupled to a frequency synthesizer 154. The synthesizer 154 includes frequency multipliers, dividers and mixing or adding circuits connected in a well-known manner to provide outputs at various frequencies. An output of the synthesizer having a frequency of about 23 kilomegacycles is connected to one input of a phase comparator 156. The other input of the phase comparator is from a klystron oscillator 158 operating at a frequency of about 23 kilomegacycles, the fifth subharmonic of the molecular resonant frequency of the beam 18. The comparator 156 may include a mixer for reducing the output frequency of the klystron and a phase discriminator comparing the reduced klystron frequency with the corresponding frequency from the synthesizer 154. The output of the comparator may thus be used to control the frequency of the klystron oscillator in a well-known phase-locking arrangement, and the frequency of the klystron oscillator 158 is thereby maintained at a predetermined multiple of the frequency of the oscillator 152.

The output of the oscillator 158 is passed through a low pass filter 160 to a harmonic generator 162 which may take the form of a 1N53 diode suitably arranged in a wave guide. The wave guide 100 whose cut-off frequency is at or slightly below the 115 kmc. resonance, serves as a high pass filter connected between the harmonic generator 162 and the cavities 22 and 24. The low pass filter 160 prevents the generated harmonics from travelling in the direction of the oscillator 158.

Still referring to FIGURE 1, the control circuit 14 includes an amplifier 166 which amplifies the output of the detector 28. The amplifier 166 excites one phase of a two-phase motor 168, the other phase of which is excited from a 100 cycle generator 170. The motor 168 is mechanically coupled to a variable capacitor 172 which controls the frequency of the oscillator 152.

The generator 170 is also the source of a 100 cycle signal used to frequency- or phase-modulate the output of the synthesizer 154 applied to the phase comparator 156. The modulation should be linear and may be accomplished by a conventional balanced phase modulator incorporated in the synthesizer. The frequency of the klystron oscillator and also the fifth harmonic thereof applied to the cavities 22 and 24 will therefore be periodically varied back and forth across a center value determined by the output of the oscillator 152. Each time the frequency in the cavities 22 and 24 passes through the molecular resonance frequency corresponding to the (O,O)→(1,O) transition, the number of molecules in the beam 18 undergoing the transition will increase and decrease, and this will be reflected as amplitude modulation on the output signal of the detector 28. Owing to the symmetry of the molecular resonance curve, the 100 cycle component of this modulation has a zero value when the center frequency of the radiation in the cavities 22 and 24 corresponds exactly to the molecular energy state transition.

If the frequency varies from the resonance value, there will be a 100 cycle component whose phase depends on whether the frequency of the radiation is higher or lower than the molecular resonance. This signal, when amplified by the amplifier 166 and applied to the two-phase motor 168, produces a variation in the capacitance of the condenser 172 in the proper direction to correct the frequency of the oscillator 152 and in turn the klystron oscillator 158.

In this manner, the control circuit 14 maintains the frequency of the oscillator 152 at a value governed by the stable resonance frequency of the molecular energy state transition of the beam 18. Over a period of time, the average ratio of oscillator frequency to molecular resonant frequency is constant, and therefore the long term stability of the oscillator 152 approaches that of the molecular resonance frequency.

Should the output frequency of the generator 12 undergo a wide departure from the resonance value, the output of the detector 28 would diminish to zero and, along with it, the 100 cycle component thereof. This would be interpreted by the control circuit 14 the same way as an on-frequency null, and as a result, there would be no corrective action to alter the frequency of the oscillator 152. Therefore, we have provided a 200 cycle filter 174 and indicator 176 connected to the output of the amplifier 166. At the 100 cycle null condition, the 200 cycle component in the output of the detector 28 is at a maximum. When the output of the detector 28 falls away because of an off-resonant output of the generator 12, the 200 cycle component also decreases, and this is registered by the indicator 176. The control circuit 14 may also incorporate the system disclosed in the copending application of W. A. Mainberger, Serial No. 744,729, filed June 26, 1958 for "Frequency Control Apparatus" and assigned to the assignee of this application.

Thus, we have described an improved molecular beam frequency standard using an energy state transition of the carbon monoxide molecule as a stabilizing mechanism for a controlled oscillator. The resonant frequency corresponding to the frequency of the radiation causing a (J,M) (O,O)→(1,O) transition is a highly stable reference, and, in fact, the effective Q of the molecular resonance is an order of magnitude greater than that of previous molecular beam standards. The carbon monoxide beam has other important attributes in addition to the high Q resulting from the high transition frequency. At the temperature of operation, the proportion of the number of molecules in the JO,MO energy state is relatively large, so that the figure of merit of a CO beam is also better than that of the previous standards. Furthermore, the low temperature of operation results in a low average velocity of the molecules in the beam and a correspondingly greater transit time. As pointed out above, this also improves the resolution of the apparatus. The substances previously found to have merit in molecular beam apparatus of this type as, for example, the alkali metals and, in particular, cesium, cannot be operated at extremely low temperatures because they will not evaporate at rates high enough to provide a beam intensity sufficient for a good signal-to-noise ratio at the output of the beam detector. The particular energy state transition utilized by our apparatus is electrically induced, and therefore small, lightweight, electrostatic separators may be used instead of the heavier, bulkier, magnetic units required where magnetically induced transitions are utilized.

We have also described a molecular beam resonance unit adapted for operation with a carbon monoxide beam and a novel low temperature molecular beam source adapted to project an intense beam of this type.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A molecular beam frequency standard comprising means supplying a beam of carbon monoxide molecules containing a substantially greater number of molecules in a first energy state than in a second energy state, a generator having an output frequency corresponding to the frequency of the transition between said energy states, means for applying the output of said generator to said beam to cause molecules in the first state to undergo a transition to the second state, a detector having an electrical output signal which is a function of the number of molecules undergoing said transition, and means responsive to said output signal for controlling the frequency of said generator to maximize the number of molecules undergoing said transition.

2. The combination defined in claim 1 in which said energy states are the JO,MO and J1,MO states.

3. A molecular beam source adapted to form a beam of carbon monoxide molecules having a temperature below 55° K.

4. A molecular beam source adapted to form a beam of carbon monoxide molecules having a temperature of approximately 35° K.

5. A beam of carbon monoxide molecules having a temperature of less than 55° K.

6. A beam of carbon monoxide molecules having a temperature of approximately 35° K.

7. A molecular beam frequency standard comprising a molecular beam source adapted to project a beam of carbon monoxide molecules, a separator adapted to separate the molecules in the JO,MO state from those in the J1,MO state, a generator having an output frequency corresponding to the transition between said states, means for applying the output of said generator to the molecules in the JO,MO state coming from said separator to cause them to transfer to the J1,MO state, a detector having an output signal which is a function of the number of molecules transferring to said J1,MO state, and means responsive to said output signal for controlling said generator to maximize the number of molecules transferring to said J1,MO state.

8. The combination defined in claim 7 including a second separator adapted to separate into separate beams the molecules in the J1,MO state and the JO,MO state after exposure of said molecules to said generator output, said detector being disposed in the path of one of said separate beams.

9. The combination defined in claim 7 in which said separator includes means for subjecting said beam to an inhomogeneous electrostatic field.

10. A molecular beam frequency standard comprising a molecular beam source adapted to project a first beam of carbon monoxide molecules, an electrostatic separator adapted to separate said first beam into a second beam containing the predominant portion of molecules in the JO,MO state, and a third beam containing the predominant portion of molecules in the J1,MO state, a generator having a nominal output frequency corresponding to the transition between said states, first and second cavities disposed in the path of said second beam, said cavities resonating at said transition frequency, means for exciting said cavities with energy from said generator, means for separating said second beam after passing through said cavities into a fourth beam containing the predominant portion of molecules of said second beam in the JO,MO state and a fifth beam including the predominant portion in the J1,MO state, a detector disposed in the path of one of said fourth and fifth beams, said detector having an output signal which is a function of the number of carbon monoxide molecules impinging thereon, and means for controlling the frequency of said generator in response to said output signal to maximize the number of molecules undergoing a transition from the JO,MO state to the J1,MO state in said cavities.

11. The combination defined in claim 10 in which said detector is disposed in the path of said fifth beam.

12. The combination defined in claim 11 including means for subjecting said first and second beams to inhomogeneous electrostatic fields to form said second, third, fourth and fifth beams.

13. The combination defined in claim 10 including means for subjecting said molecules to a weak, substantially-uniform electrostatic field during the interval between their entry into said first cavity and their exit from said second cavity.

14. The combination defined in claim 10 in which said beam source is adapted to project a beam having a temperature less than 55° K.

15. A molecular beam source adapted to project a beam of carbon monoxide molecules, said source comprising a housing, a first surface in said housing, means for cooling said first surface below the freezing point of carbon monoxide under vacuum conditions, whereby carbon monoxide vapors in said housing may condense and solidify on said surface, a collimator extending through a surface of said housing, and means for heating the carbon monoxide deposited on said first surface above said freezing point.

16. The combination defined in claim 15 in which the axis of said collimator is perpendicular to said first surface to facilitate passage of molecules evaporating from said first surface through said collimator.

17. A molecular beam source adapted to project a beam of carbon monoxide molecules, said source comprising a first housing, a second housing disposed within said first housing, means sealing the interior of said first housing from the interior of said second housing, means for supplying liquid helium to the interior of said second housing to chill said second housing below the freezing temperature of carbon monoxide, means for admitting carbon monoxide gas into the interior of said first housing to condense and solidify on said second housing, a collimator extending through a surface of said first housing from the interior to the exterior thereof, and means for heating said second housing above said freezing temperature.

18. The combination defined in claim 17 in which the axis of said collimator extends toward said second housing.

19. A molecular beam frequency standard comprising means adapted to supply a beam of carbon monoxide molecules containing a substantially greater number of molecules in the JO,MO state than the J1,MO state, a generator having a nominal output frequency corresponding to the transition between said states, and means for controlling the frequency of said generator to make it conform to the frequency of said transition.

20. A resonance unit adapted for incorporation in a molecular beam frequency standard, said resonance unit comprising a molecular beam source adapted to project a first beam of carbon monoxide molecules having a temperature below 55° K., an electrostatic separator adapted to separate said first beam into a second beam containing the predominant portion of molecules in the JO,MO state and a third beam containing the predominant portion of molecules in the J1,MO state, first and second cavities successively disposed in the path of said beam, said cavities resonating at the frequency of the transition between said states, means for separating said second beam after passing through said cavities into a fourth beam containing the predominant portion of molecules in said second beam in the JO,MO state and a fifth beam containing the predominant portion in the J1,MO state, and a detector disposed in the path of one of said fourth and fifth beams, said detector adapted to provide an output signal which is a function of the number of carbon monoxide molecules impinging thereon.

21. The combination defined in claim 20 including means for subjecting said molecules of said second beam to a predetermined homogeneous electrostatic field from the time said molecules enter said first cavity until they leave said second cavity.

22. The combination defined in claim 21 in which the direction of said electrostatic field coincides with the direction of the alternating electric fields in said cavities when said cavities are resonated at said transition frequency.

References Cited in the file of this patent

Frequency and Time Standards by Lewis in Proc. of IRE, Sept. 1955, pages 1046–1068.

The Solid-State Maser by Meyer in Electronics, Apr. 25, 1958, pages 66–71.

Quantum Electronics by Townes, published by Columbia University Press, 1960, New York, Sept. 14–16, 1959, Conference Date, pages 62–66.